(12) United States Patent
Yamazaki et al.

(10) Patent No.: US 10,307,743 B2
(45) Date of Patent: Jun. 4, 2019

(54) HONEYCOMB STRUCTURE

(71) Applicant: NGK INSULATORS, LTD., Nagoya (JP)

(72) Inventors: Satoshi Yamazaki, Nagoya (JP); Toru Hayase, Nagoya (JP); Kenji Morimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 38 days.

(21) Appl. No.: 15/467,103

(22) Filed: Mar. 23, 2017

(65) Prior Publication Data

US 2017/0282167 A1    Oct. 5, 2017

(30) Foreign Application Priority Data

Mar. 31, 2016    (JP) .................. 2016-072586

(51) Int. Cl.
*B01D 53/04* (2006.01)
*B01J 21/04* (2006.01)
(Continued)

(52) U.S. Cl.
CPC .......... *B01J 29/85* (2013.01); *B01D 53/0407* (2013.01); *B01D 53/8628* (2013.01); *B01D 53/9431* (2013.01); *B01J 21/04* (2013.01); *B01J 21/12* (2013.01); *B01J 29/084* (2013.01); *B01J 29/146* (2013.01); *B01J 29/40* (2013.01); *B01J 29/46* (2013.01); *B01J 29/7007* (2013.01); *B01J 29/7015* (2013.01); *B01J 29/763* (2013.01); *B01J 29/7615* (2013.01); *B01J 29/80* (2013.01);
(Continued)

(58) Field of Classification Search
None
See application file for complete search history.

(56) References Cited

U.S. PATENT DOCUMENTS 8,871,667 B2    10/2014  Kikuchi et al.
2011/0236271 A1   9/2011  Kikuchi et al.
(Continued)

FOREIGN PATENT DOCUMENTS

EP    2 368 631 A1    9/2011
EP    2 845 646 A2    3/2015
(Continued)

OTHER PUBLICATIONS

Extended European Search Report (Application No. 17163126.0) dated Aug. 28, 2017.

*Primary Examiner* — Colin W. Slifka
(74) *Attorney, Agent, or Firm* — Burr & Brown, PLLC

(57) ABSTRACT

The honeycomb structure includes a honeycomb structure body made of a zeolite material containing at least a coarse particle zeolite having a large average particle diameter (coarse zeolite particles). A fine particle zeolite having an average particle diameter smaller than that of the coarse particle zeolite (fine zeolite particles), and an inorganic bonding material, the coarse particle zeolite (the coarse zeolite particles) is a chabazite type zeolite in which an average particle diameter of primary particles is 2 μm or more and 6 μm or less, and in the fine particle zeolite (the fine zeolite particles), an average particle diameter of primary particles is 0.02 μm or more and smaller than 2 μm, and in the zeolite material which is comprised the honeycomb structure body, a ratio of a volume of pores having pore diameters of 0.02 to 0.15 μm to a volume of all pores is 42% or less.

9 Claims, 6 Drawing Sheets

(51) Int. Cl.

| | | |
|---|---|---|
| *B01J 21/12* | (2006.01) | |
| *B01J 29/76* | (2006.01) | |
| *B01J 29/80* | (2006.01) | |
| *B01J 29/85* | (2006.01) | |
| *B01J 35/00* | (2006.01) | |
| *B01J 35/04* | (2006.01) | |
| *B01J 37/00* | (2006.01) | |
| *B01J 37/04* | (2006.01) | |
| *B01J 37/08* | (2006.01) | |
| *B01J 37/30* | (2006.01) | |
| *B01D 53/86* | (2006.01) | |
| *B01J 29/08* | (2006.01) | |
| *B01J 29/14* | (2006.01) | |
| *B01J 29/40* | (2006.01) | |
| *B01J 29/46* | (2006.01) | |
| *B01J 29/70* | (2006.01) | |
| *B01J 35/02* | (2006.01) | |
| *B01J 35/10* | (2006.01) | |
| *B01D 53/94* | (2006.01) | |
| *C04B 38/00* | (2006.01) | |

(52) U.S. Cl.
CPC ......... *B01J 35/0006* (2013.01); *B01J 35/023* (2013.01); *B01J 35/04* (2013.01); *B01J 35/1033* (2013.01); *B01J 35/1052* (2013.01); *B01J 35/1095* (2013.01); *B01J 37/0018* (2013.01); *B01J 37/04* (2013.01); *B01J 37/082* (2013.01); *B01J 37/30* (2013.01); *C04B 38/0006* (2013.01); *C04B 38/0009* (2013.01); *B01D 2253/108* (2013.01); *B01D 2253/311* (2013.01); *B01D 2255/20761* (2013.01); *B01D 2255/50* (2013.01); *B01D 2255/502* (2013.01); *B01D 2255/504* (2013.01); *B01D 2255/912* (2013.01); *B01D 2255/9202* (2013.01); *B01D 2255/9205* (2013.01); *B01D 2255/9207* (2013.01); *B01D 2257/404* (2013.01); *B01D 2257/702* (2013.01); *B01J 2229/183* (2013.01); *B01J 2229/186* (2013.01); *B01J 2229/42* (2013.01)

(56) References Cited

U.S. PATENT DOCUMENTS

| | | |
|---|---|---|
| 2011/0237423 A1 | 9/2011 | Kikuchi et al. |
| 2015/0065336 A1 | 3/2015 | Sato et al. |
| 2015/0273446 A1 | 10/2015 | Kunieda et al. |
| 2016/0001277 A1 | 1/2016 | Usui et al. |

FOREIGN PATENT DOCUMENTS

| | | |
|---|---|---|
| EP | 2 905 075 A1 | 8/2015 |
| JP | 60-131857 A1 | 7/1985 |
| JP | 5560158 B2 | 7/2014 |
| JP | 5580090 B2 | 8/2014 |
| JP | 5732170 B1 | 6/2015 |
| JP | 2015-193489 A1 | 11/2015 |
| JP | 5837408 B2 | 12/2015 |

HONEYCOMB STRUCTURE

The present application is an application based on JP-2016-072586 filed on Mar. 31, 2016 with Japan Patent Office, the entire contents of which are incorporated herein by reference.

BACKGROUND OF THE INVENTION

Field of the Invention

The present invention relates to a honeycomb structure, and more particularly, it relates to a honeycomb structure which has an excellent $NO_x$ purification performance and also an excellent mechanical strength.

Description of the Related Art

A zeolite is a type of silicate salt having a mesh-like crystal structure in which fine pores having a uniform diameter are formed. Furthermore, it is known that as zeolites, various chemical compositions are present and that a large number of types of crystal structures having different pore shapes are present. These zeolites have an inherent adsorption ability, a catalytic performance, solid acid characteristics, an ion exchange ability, and the like based on the respective chemical compositions and crystal structures, and are utilized in various use applications such as an adsorbing material, a catalyst, a catalyst carrier, a gas separation membrane, and an ion exchanger.

For example, the zeolite is utilized in a use such as an adsorption material to adsorb nitrogen oxides ($NO_x$), hydrocarbons (HC) and the like in a car exhaust gas, or the gas separation membrane to selectively separate only p-xylene from a xylene isomer. Heretofore, as a purifying member to purify the car exhaust gas, a catalyst body onto which an ion-exchanged zeolite is loaded has been used in a honeycomb structure of a honeycomb shape made of cordierite or the like.

In a case where the zeolite is loaded onto the above honeycomb structure made of cordierite or the like, cordierite or the like does not exhibit an operation of the $NO_x$ purification, the adsorption of hydrocarbons, or the like, and hence a pressure loss when an exhaust gas passes might increase as much as the presence of cordierite or the like. To solve this problem, there has been suggested a method of forming and firing a forming raw material containing an ion-exchanged zeolite with metal ions to form a honeycomb structure itself (e.g., see Patent Documents 1 to 4).
[Patent Document 1] JP 5560158
[Patent Document 2] JP 5837408
[Patent Document 3] JP 5580090
[Patent Document 4] JP 5732170

SUMMARY OF THE INVENTION

In Patent Documents 1 and 2, a honeycomb structure made of a zeolite raw material containing a phosphate-based zeolite is disclosed. The phosphate-based zeolite is excellent in a $NO_x$ purification performance and can improve the $NO_x$ purification performance of the honeycomb structure made of the zeolite raw material. Here, in the phosphate-based zeolite, a lattice constant changes due to an adsorption or a desorption of water, and hence a contraction or an expansion of the honeycomb structure easily occurs. Consequently, the honeycomb structure in which the phosphate-based zeolite is only used is remarkably easy to be damaged. To solve such a problem, in Patent Documents 1 and 2, there is described a technology of preparing the honeycomb structure from the zeolite raw material to which a β-type zeolite or a ZSM-5 type zeolite is added in addition to the phosphate-based zeolite. For example, in Patent Document 1, it is described that the honeycomb structure is prepared by using such a zeolite raw material as described above, and hence the damages on the honeycomb structure which are generated by the adsorption or the desorption of the water can effectively be inhibited.

Although the honeycomb structures described in Patent Documents 1 and 2 enable the damages caused by the adsorption or the desorption of the water to be inhibited, it has been necessary to increase an amount of an inorganic bonding material for the purpose of sufficiently acquiring a strength of the honeycomb structure. For example, in the honeycomb structures described in Patent Documents 1 and 2, when about 20 mass % of the inorganic bonding material is not added to the zeolite raw material, it is difficult to obtain the honeycomb structure having such a strength resistant to actual use. In this way, in the honeycomb structures described in Patent Documents 1 and 2, the amount of the inorganic bonding material is increased, thereby making it possible to improve the mechanical strength to a certain degree. However, when the large amount of the inorganic bonding material is contained, a ratio of the zeolite to be included in the honeycomb structure decreases, and hence there has been the problem that the purification performance deteriorates.

Furthermore, in Patent Document 3, for the purpose of preventing the deterioration of the purification performance caused by the large amount of the contained inorganic bonding material, there has been suggested a zeolite structure made of a zeolite raw material including fine zeolite particles and coarse zeolite particles. However, in the zeolite structure described in Patent Document 3, it is comparatively difficult to use a chabazite type zeolite which has a more excellent purification performance. Consequently, there is strongly required development of a honeycomb structure made of a zeolite material which has an excellent $NO_x$ purification performance and which enables a decrease of strength of the honeycomb structure to be efficiently inhibited, by a method different from the technology described in Patent Document 3.

Furthermore, in Patent Document 4, a honeycomb catalyst in which a zeolite having a chabazite structure is used is disclosed. Such a honeycomb catalyst has the problem that when an amount of zeolite increases to maintain a high purification performance, the strength decreases.

The present invention has been developed in view of the above-mentioned problem. According to the present invention, there is provided a honeycomb structure which has an excellent $NO_x$ purification performance and also an excellent mechanical strength. In particular, according to the present invention, there is provided the honeycomb structure in which agglomerating properties of the inorganic bonding material to bond zeolite particles to one another improve to achieve a high mechanical strength while maintaining a high $NO_x$ purification performance.

The present inventor has intensively studied to solve the problems of the conventional technology and has eventually obtained the following finding. First, the present inventor has studied agglomerating properties of an inorganic bonding material to bond zeolite particles to one another in a honeycomb structure made of a conventional zeolite material. Consequently, in the conventional honeycomb structure, it has become clear that the inorganic bonding material is dispersed in the zeolite material and that a part of the inorganic bonding material does not sufficiently contribute to the bonding of the zeolite particles to one another. That is, in a case where it is possible to improve the agglomerating properties of the inorganic bonding material to bond the zeolite particles to one another, it is possible to inhibit a decrease of a mechanical strength, especially a compressive strength of the honeycomb structure even when the amount of the inorganic bonding material decreases as compared with the conventional honeycomb structure. Furthermore, when the amount of the inorganic bonding material can decrease, a ratio of the zeolite to be included in the honeycomb structure relatively increases and the purification performance can improve.

The present inventor has repeated various experiments concerning a relation between the agglomerating properties of the inorganic bonding material in the zeolite material and the strength thereof while changing a type or particle diameters of the zeolite particles, a type of a raw material used in the inorganic bonding material, or the like. Furthermore, the present inventor has found that in the honeycomb structure made of the zeolite material which has an excellent agglomerating properties of the inorganic bonding material and which has a high strength, a ratio of a volume of pores having specific pore diameters to a volume of all pores is included in a certain range, and the inventor has completed the present invention. Specifically, according to the present invention, there is provided the following honeycomb structure.

According to a first aspect of the present invention, a honeycomb structure is provided including a honeycomb structure body made of a zeolite material containing at least a coarse particle zeolite having a large average particle diameter, a fine particle zeolite having an average particle diameter smaller than that of the coarse particle zeolite, and an inorganic bonding material, wherein the coarse particle zeolite is a chabazite type zeolite in which an average particle diameter of primary particles is 2 μm or more and 6 μm or less, in the fine particle zeolite, an average particle diameter of primary particles is 0.02 μm or more and smaller than 2 μm, and in the zeolite material which is comprised the honeycomb structure body, a ratio of a volume of pores having pore diameters of 0.02 to 0.15 μm to a volume of all pores is 42% or less.

According to a second aspect of the present invention, the honeycomb structure according to the above first aspect is provided, wherein in the zeolite material, a ratio of a volume of pores having pore diameters smaller than 0.02 μm to the volume of all the pores is from 8 to 20%.

According to a third aspect of the present invention, the honeycomb structure according to the above first or second aspects is provided, wherein in the zeolite material, a ratio of a volume of pores having pore diameters in excess of 0.15 μm to the volume of all the pores is from 40 to 60%, and a ratio of a volume of pores having pore diameters of 0.52 μm or more to the volume of all the pores is 5% or less.

According to a fourth aspect of the present invention, the honeycomb structure according to any one of the above first to third aspects is provided, wherein the coarse particle zeolite and the fine particle zeolite are copper ion-exchanged zeolite.

According to a fifth aspect of the present invention, the honeycomb structure according to any one of the above first to fourth aspects is provided, wherein the coarse particle zeolite is at least one selected from the group consisting of chabazite, SAPO-34 and SSZ-13.

According to a sixth aspect of the present invention, the honeycomb structure according to any one of the above first to fifth aspects is provided, wherein the fine particle zeolite is at least one selected from the group consisting of a β-type zeolite, a Y-type zeolite, a ZSM-5 type zeolite, and a chabazite type zeolite.

According to a seventh aspect of the present invention, the honeycomb structure according to any one of the above first to sixth aspects is provided, wherein the zeolite material includes 3 vol % or more of the inorganic bonding material in a total volume of the zeolite material, and the inorganic bonding material includes alumina derived from basic aluminum lactate at a ratio of 1 vol % or more to the total volume of the zeolite material.

According to an eighth aspect of the present invention, the honeycomb structure according to the above seventh aspect is provided, wherein the inorganic bonding material includes the alumina derived from basic aluminum lactate and alumina derived from boehmite, and a value of A1/A2 which is a ratio of a volume A1 of the alumina derived from basic aluminum lactate to a volume A2 of the alumina derived from boehmite is 0.6 or more.

According to a ninth aspect of the present invention, the honeycomb structure according to any one of the above first to eighth aspects is provided, wherein the zeolite material includes at least one selected from the group consisting of inorganic fibers such as an alumina fiber, a silica alumina fiber, and a glass fiber.

According to a tenth aspect of the present invention, the honeycomb structure according to the above ninth aspect is provided, wherein the zeolite material includes 3 to 8 vol % of the inorganic fiber in a total volume of the zeolite material.

A honeycomb structure of the present invention includes a honeycomb structure body made of a zeolite material containing at least a coarse particle zeolite, a fine particle zeolite, and an inorganic bonding material. Further, the coarse particle zeolite is a chabazite type zeolite in which an average particle diameter of primary particles is 2 μm or more and 6 μm or less, and in the fine particle zeolite, an average particle diameter of primary particles is 0.02 μm or more and smaller than 2 μm. Furthermore, in the zeolite material which is comprised the honeycomb structure body, a ratio of a volume of pores having pore diameters of 0.02 to 0.15 μm to a volume of all pores is 42% or less. Such a honeycomb structure of the present invention produces an effect that the honeycomb structure has an excellent $NO_x$ purification performance and also an excellent mechanical strength, especially an excellent compressive strength. Particularly, in the honeycomb structure of the present invention, improving agglomerating properties of the inorganic bonding material to bond zeolite particles to one another enables a high mechanical strength to be achieved while maintaining a high $NO_x$ purification performance.

DESCRIPTION OF THE PREFERRED EMBODIMENTS

Hereinafter, an embodiment of the present invention will be described. However, the present invention is not limited to the following embodiment. Therefore, it should be understood that modifications, improvements and the like can suitably be added to the following embodiment on the basis of ordinary knowledge of a person skilled in the art without departing from the gist of the present invention.

Figure 1:
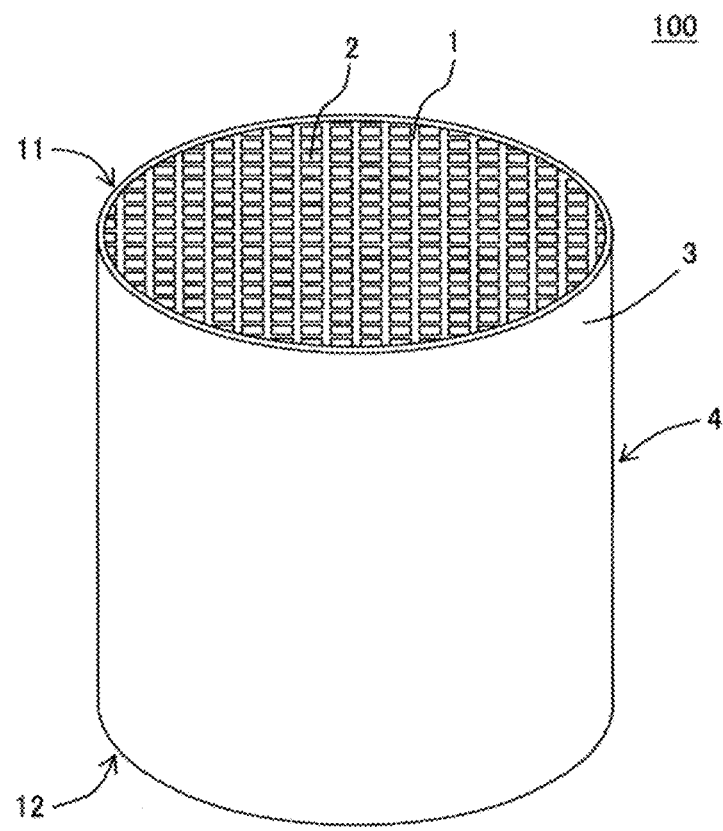
FIG. 1 is a perspective view schematically showing a honeycomb structure according to an embodiment of the present invention.
Figure 2:
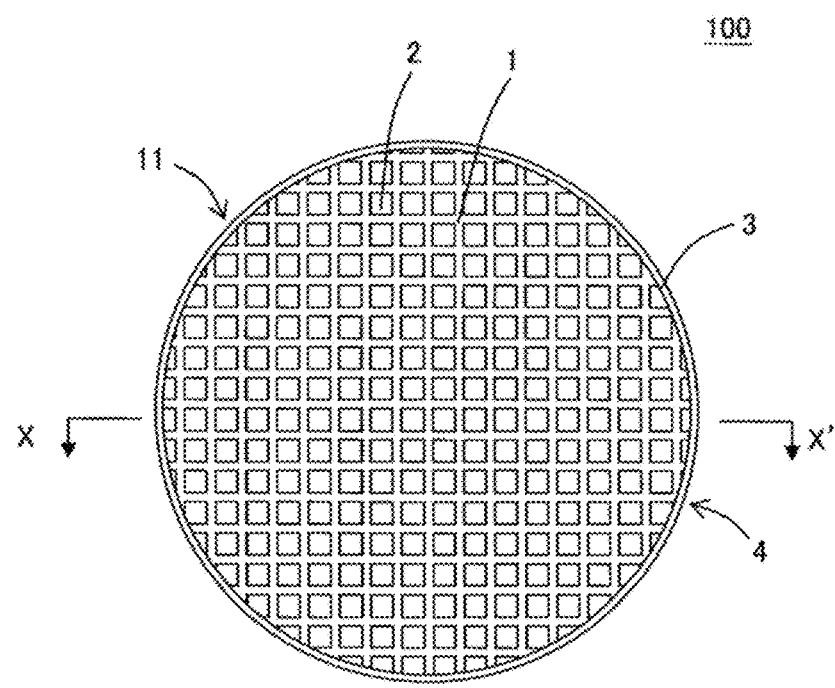
FIG. 2 is a plan view schematically showing a first end face of the honeycomb structure shown in FIG. 1.
Figure 3:
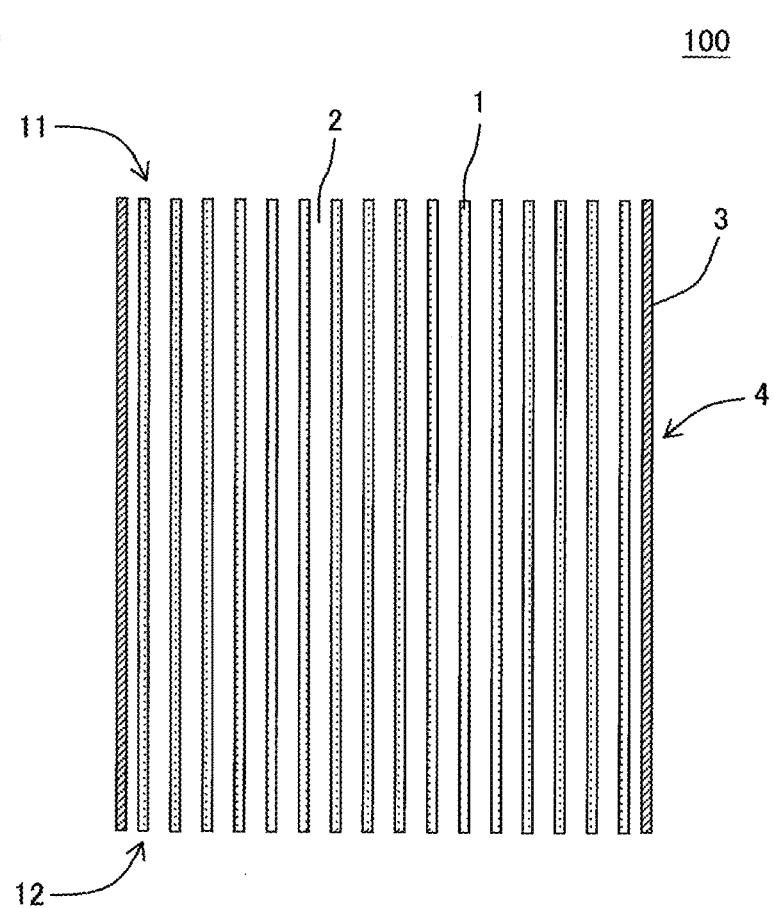
FIG. 3 is a cross-sectional view schematically showing a cross section along the X-X' line of FIG. 2.

(1) Honeycomb Structure:

As shown in FIG. 1 to FIG. 3, an embodiment of a honeycomb structure of the present invention is directed to a honeycomb structure 100 which includes a honeycomb structure body 4 made of a zeolite material containing at least a coarse particle zeolite, a fine particle zeolite, and an inorganic bonding material. The honeycomb structure body 4 has partition walls 1 which define a plurality of cells 2 which extend from a first end face 11 to a second end face 12 and become through channels for a fluid. It is preferable that the honeycomb structure 100 of the present embodiment is directed to, for example, the honeycomb structure 100 formed by extruding a zeolite raw material which contains at least zeolite particles and the inorganic bonding material described above.

The honeycomb structure body 4 shown in FIG. 1 to FIG. 3 has a circumferential wall 3 disposed to surround the partition walls 1 which define the cells 2. Here, FIG. 1 is a perspective view schematically showing the honeycomb structure according to an embodiment of the present invention. FIG. 2 is a plan view schematically showing the first end face of the honeycomb structure shown in FIG. 1. FIG. 3 is a cross-sectional view schematically showing a cross section along the X-X' line of FIG. 2.

Furthermore, in the present specification, the zeolite raw material means a forming raw material containing at least the zeolite particles, and the inorganic bonding material or a raw material of the inorganic bonding material, to manufacture the honeycomb structure. Furthermore, the zeolite material means a material which is comprised the honeycomb structure manufactured by drying and firing a formed body obtained by forming the zeolite raw material, i.e., a material which is comprised a sintered body.

The honeycomb structure 100 of the present embodiment is characterized by including the honeycomb structure body 4 as follows. First, as described above, the honeycomb structure body 4 is made of the zeolite material containing at least the coarse particle zeolite, the fine particle zeolite, and the inorganic bonding material. The coarse particle zeolite and fine particle zeolite which are contained in the zeolite material are particulate, and will hereinafter be suitably referred to as "coarse zeolite particles" and "fine zeolite particles" sometimes. Further, the coarse zeolite particles and fine zeolite particles will generically be simply referred to as "the zeolite particles" sometimes. The inorganic bonding material is a bonding material to bond a plurality of zeolite particles to one another.

Figure 4:
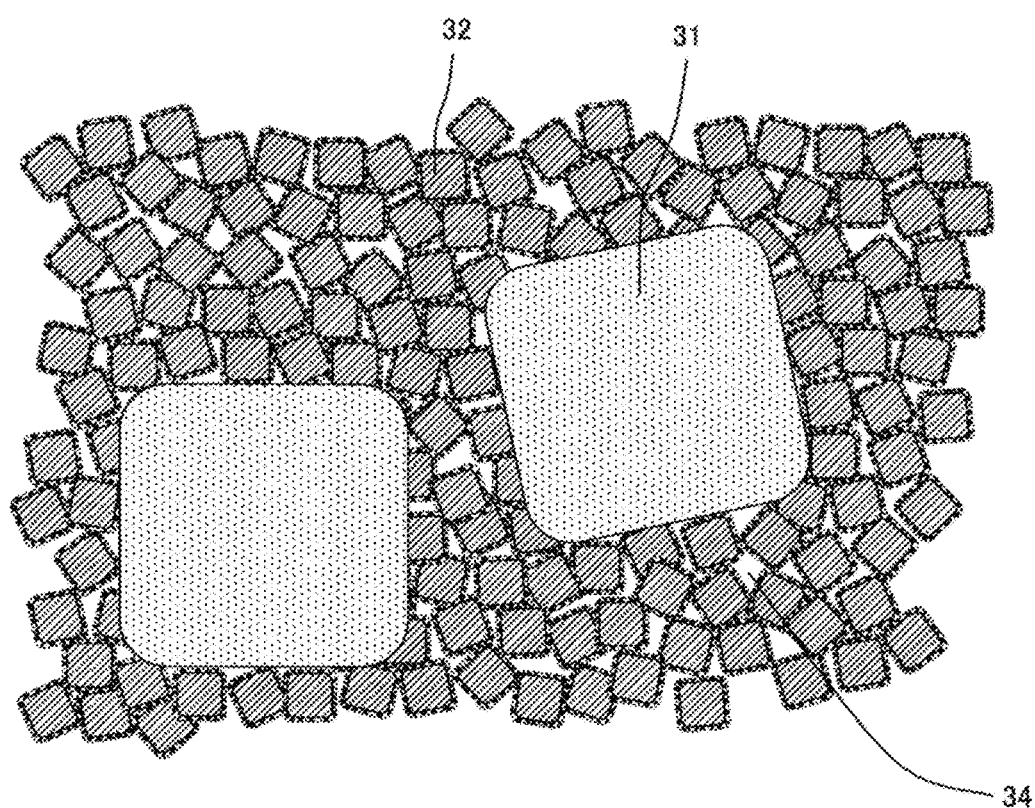
FIG. 4 is an explanatory view schematically showing behaviors of coarse zeolite particles and fine zeolite particles in a zeolite material which is comprised a honeycomb structure body in the honeycomb structure of the present invention.

The coarse particle zeolite included in the zeolite material is a chabazite type zeolite in which an average particle diameter of primary particles is 2 μm or more and 6 μm or less. Furthermore, in the fine particle zeolite contained in the zeolite material, an average particle diameter of primary particles is 0.02 μm or more and smaller than 2 μm. That is, in the honeycomb structure 100 of the present embodiment, the average particle diameter of the coarse particle zeolite made of the chabazite type zeolite is relatively large and the average particle diameter of the fine particle zeolite is relatively small. Consequently, the zeolite material which is comprised the honeycomb structure body 4 has a state where, for example, as shown in FIG. 4, fine zeolite particles 32 having small particle diameters are arranged to surround coarse zeolite particles 31 having large particle diameters. In this case, small clearances might be generated between the coarse zeolite particle 31 and the fine zeolite particle 32, and between the fine zeolite particles 32, respectively, and the clearances form pores 34 of a porous body. Here, as shown in FIG. 4, the pores 34 formed between the coarse zeolite particle 31 and the fine zeolite particle 32, and between the fine zeolite particles 32, respectively, will be referred to as first pores 34 sometimes.

Figure 5:
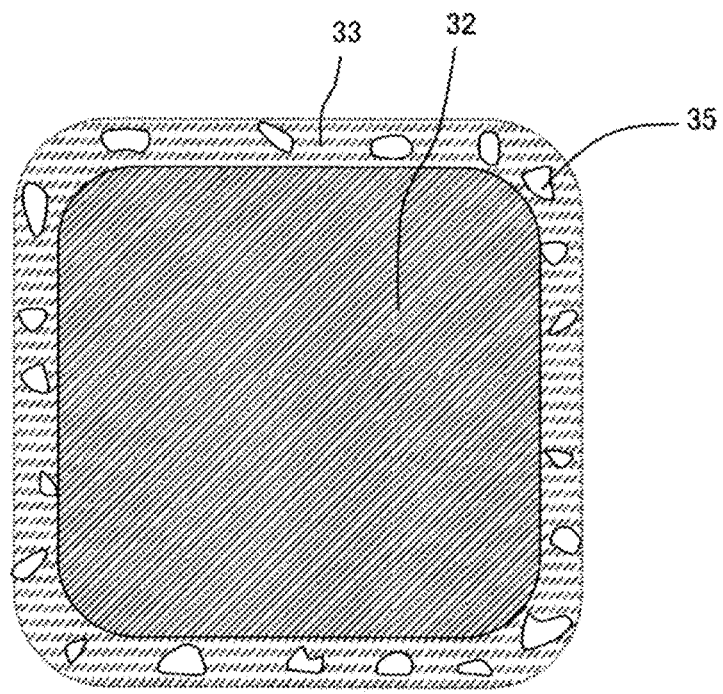
FIG. 5 is an explanatory view schematically showing an enlarged state of the fine zeolite particle shown in FIG. 4.

Furthermore, when the fine zeolite particle 32 shown in FIG. 4 is enlarged, an inorganic bonding material 33 is disposed to surround the fine zeolite particle 32 in a periphery of the fine zeolite particle 32 as shown in FIG. 5. Further, in the inorganic bonding material 33, remarkably small pores 35 are formed. The pores 35 formed in the inorganic bonding material 33 will be referred to as second pores 35 sometimes. Pore diameters of the second pores 35 are smaller than those of the first pores 34 shown in FIG. 4. That is, in a porous zeolite material 40 shown in FIG. 4, in addition to the first pores 34 formed among the zeolite particles, the remarkably small second pores 35 (see FIG. 5) which are not shown in FIG. 4 are formed in the inorganic bonding material 33.

Here, FIG. 4 is an explanatory view schematically showing behaviors of the coarse zeolite particles and the fine zeolite particles in the zeolite material which is comprised the honeycomb structure body in the honeycomb structure of the present invention. FIG. 5 is an explanatory view schematically showing the enlarged state of the fine zeolite particle shown in FIG. 4. It is to be noted that FIG. 4 and FIG. 5 are schematic views each showing a simplified microstructure of the zeolite material, and in an actual zeolite material, a shape of each zeolite particle and details of an agglomerated/dispersed state and another state of the inorganic bonding material might be different from those shown in the drawing sometimes.

In the honeycomb structure of the present embodiment, in the zeolite material which is comprised the honeycomb structure body, a ratio of a volume of pores having pore diameters of 0.02 to 0.15 μm to a volume of all pores is 42% or less. That is, in the honeycomb structure body 4 of the honeycomb structure 100 of the present embodiment, a ratio of a total volume of pores having pore diameters smaller than 0.02 μm and pores having pore diameters in excess of 0.15 µm to the volume of all the pores is in excess of 58%. Consequently, in the honeycomb structure of the present embodiment, as shown in FIG. 4 and FIG. 5, the pores 34 and 35 roughly divided into two types in accordance with a size of the pore diameter are formed around the coarse particle zeolite and the fine particle zeolite. For example, the pores having the pore diameters smaller than 0.02 µm are mainly the second pores 35 shown in FIG. 5, and the pores having the pore diameters in excess of 0.15 µm are mainly the first pores 34 shown in FIG. 4.

The honeycomb structure 100 of the present embodiment produces the effect that the honeycomb structure has an excellent $NO_x$ purification performance and also an excellent mechanical strength, especially an excellent compressive strength. Especially, the zeolite material which is comprised the honeycomb structure body 4 is made of a zeolite material containing the coarse particle zeolite made of the chabazite type zeolite in which the average particle diameter of the primary particles is 2 µm or more and 6 µm or less, and hence, it is possible to achieve a high $NO_x$ purification performance.

Here, the chabazite type zeolite is referred to as a zeolite having a three-dimensional pore structure which comprises an oxygen 8-membered ring of 3.8×3.8 angstroms.

Furthermore, when the ratio of the volume of the pores having the pore diameters of 0.02 to 0.15 µm satisfies the above numeric range, it is possible to achieve the high mechanical strength. That is, when the ratio of the volume of the pores having the pore diameters of 0.02 to 0.15 µm satisfies the above numeric range, it can be considered that in the microstructure of the zeolite material, the pores having the pore diameters smaller than 0.02 µm and the pores having the pore diameters in excess of 0.15 µm are formed as much as suitable volumes, respectively. Further, when the volume of the pores having the pore diameters smaller than 0.02 µm is sufficiently large, it can be considered that the microstructure is agglomerated so that the inorganic bonding material comparatively densely surrounds the fine zeolite particles. Further, in this way, the fine zeolite particles surrounded with the agglomerated inorganic bonding material are further arranged to surround the coarse zeolite particles, the pores having the pore diameters in excess of 0.15 µm are more selectively formed. Consequently, in the honeycomb structure of the present embodiment, the ratio of the volume of the pores having the pore diameters of 0.02 to 0.15 µm is remarkably low as compared with a conventional honeycomb structure, and as a result, the high mechanical strength is developed. It is to be noted that it is possible to achieve the inorganic bonding material having high agglomerating properties as described above remarkably suitably in a case of using basic aluminum lactate as the raw material of the inorganic bonding material and using alumina derived from basic aluminum lactate as the inorganic bonding material. That is, in the honeycomb structure of the present embodiment, the inorganic bonding material includes alumina derived from basic aluminum lactate, so that the ratio of the volume of the pores having the pore diameters of 0.02 to 0.15 µm can be set to 42% or less. Hereinafter, the ratio of the volume of the pores having predetermined pore diameters to the volume of all the pores will be simply referred to as a pore volume ratio sometimes. The pore volume ratio of the pores having the pore diameters of 0.02 to 0.15 µm is preferably from 20 to 42%, further preferably from 20 to 40%, and especially preferably from 25 to 35%.

Figure 6:
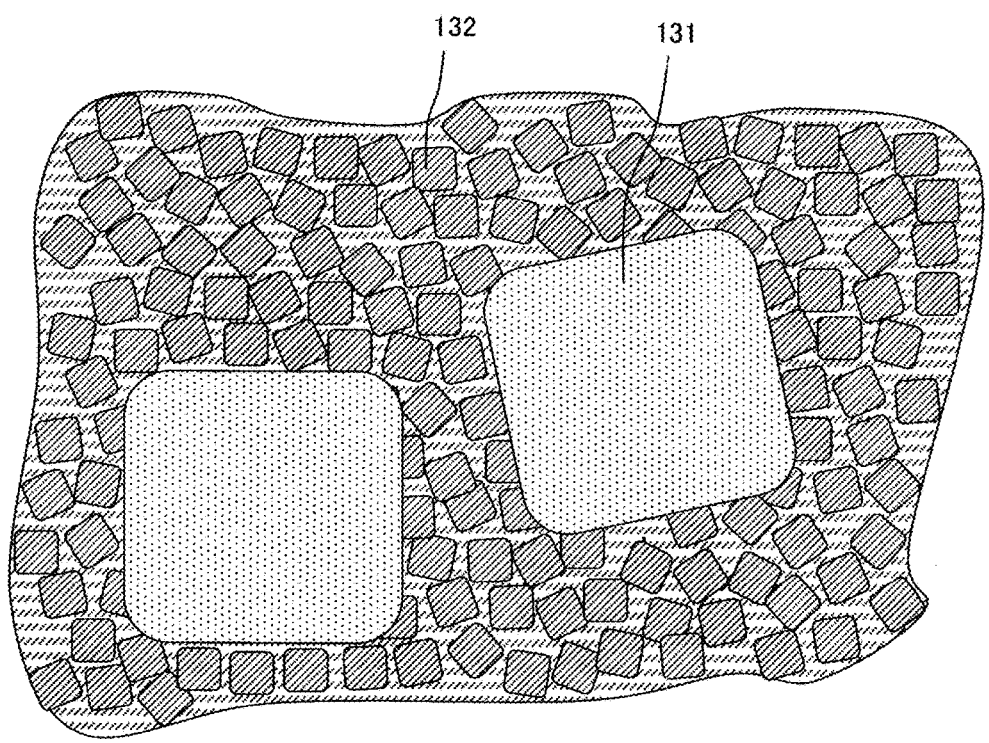
FIG. 6 is an explanatory view schematically showing behaviors of coarse zeolite particles and fine zeolite particles in another zeolite material.
Figure 7:
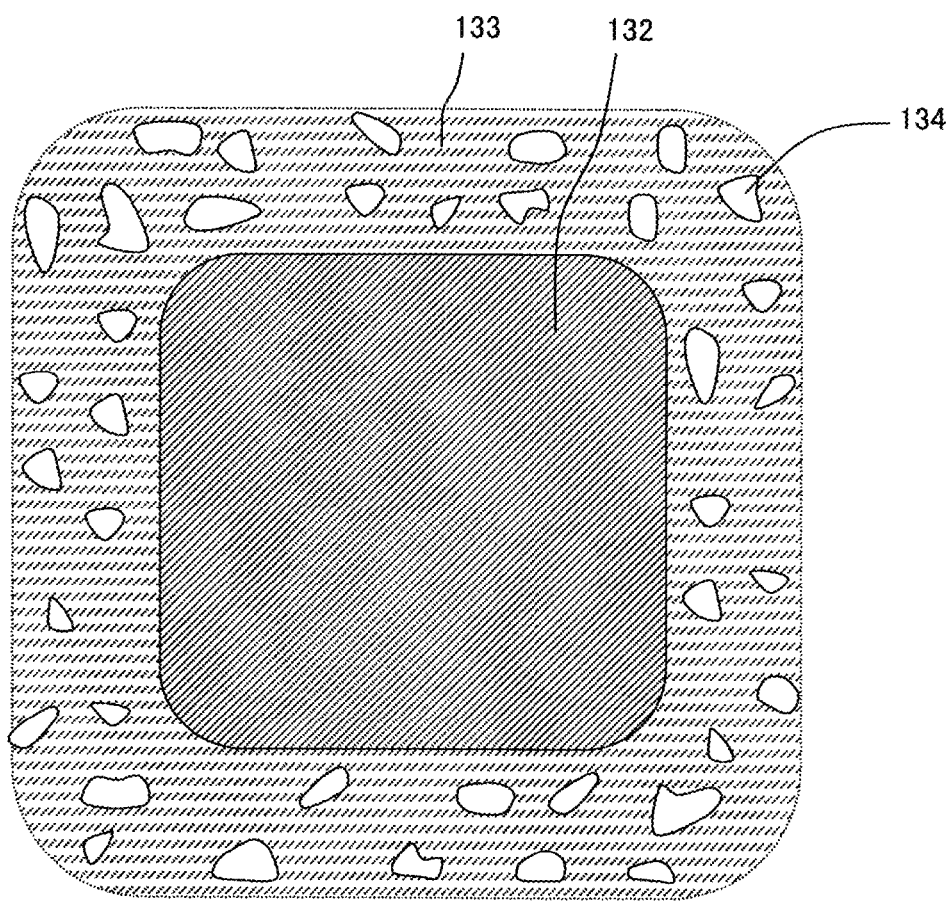
FIG. 7 is an explanatory view schematically showing an enlarged state of the fine zeolite particle shown in FIG. 6.

Hereinafter, there will be described an example where the inorganic bonding material is not agglomerated around the zeolite particles, especially around the fine zeolite particles but is dispersed in a comparatively broad range, with reference to FIG. 6 and FIG. 7. Here, FIG. 6 is an explanatory view schematically showing behaviors of coarse zeolite particles and fine zeolite particles in another zeolite material. FIG. 7 is an explanatory view schematically showing an enlarged state of the fine zeolite particle shown in FIG. 6.

As shown in FIG. 6 and FIG. 7, in a case where an inorganic bonding material 133 is not agglomerated around fine zeolite particles 132, but the inorganic bonding material 133 is dispersed in a comparatively broad range, the fine zeolite particles 132 and the inorganic bonding material 133 are broadly distributed around coarse zeolite particles 131. For example, in a case where the inorganic bonding material 133 is dispersed in a comparatively broad range as shown in FIG. 7, a density of the inorganic bonding material 133 which is present around the fine zeolite particles 132 decreases, and a range in which the inorganic bonding material 133 is present around the fine zeolite particles 132 broadens. In such a case, as shown in FIG. 6, the inorganic bonding material 133 is broadly dispersed among a plurality of coarse zeolite particles 131, and the fine zeolite particles 132 are comparatively uniformly distributed in the inorganic bonding material 133. In a zeolite material 140 of such a state, the inorganic bonding material 133 is not agglomerated, and hence the ratio of the volume of the pores having the pore diameters of 0.02 to 0.15 µm increases. Consequently, the ratio of the volume of the pores having the pore diameters of 0.02 to 0.15 µm to the volume of all the pores is in excess of 42%, and the pore volume ratio of the honeycomb structure of the present embodiment is not satisfied. Further, in the zeolite material 140 shown in FIGS. 6 and 7, the inorganic bonding material 133 is not agglomerated around the fine zeolite particles 132, but the inorganic bonding material 133 is dispersed in the comparatively broad range, and hence strength decreases. On the other hand, in the zeolite material 40 shown in FIG. 4 and FIG. 5, the inorganic bonding material 33 is agglomerated around each fine zeolite particle 32, and the inorganic bonding material 33 forms a comparatively dense neck portion to increase the strength.

It is to be noted that when the average particle diameter of the primary particles of the coarse particle zeolite is smaller than 2 µm or in excess of 6 µm or the average particle diameter of the primary particles of the fine particle zeolite is smaller than 0.02 µm or 2 µm or more, it becomes difficult to form the microstructure of the zeolite material shown in FIG. 4 and FIG. 5. Therefore, also as important requirements for the purpose of obtaining the effect of improving the agglomerating properties of the inorganic bonding material to improve the mechanical strength, in the coarse particle zeolite, the average particle diameter of the primary particles is 2 µm or more and 6 µm or less, and in the fine particle zeolite, the average particle diameter of the primary particles is 0.02 µm or more and smaller than 2 µm. Here, "the primary particles" are not secondary particles in which a plurality of particles having small particle diameters gather and harden into one unit by Van der Waals force among the particles, but the primary particles are independent particles, i.e., one crystal. Hereinafter, in a case where the average particle diameters of the coarse particle zeolite and the fine particle zeolite are described, the average particle diameters mean "the average particle diameter of the primary particles" unless otherwise specified.

The average particle diameters of the coarse particle zeolite and the fine particle zeolite can be measured by the following method. First, a surface or a broken surface of the honeycomb structure body made of the zeolite material is observed with a scanning electron microscope, and an observed image is imaged. Hereinafter, the scanning electron microscope will be referred to as "SEM" sometimes. The "SEM" is an abbreviation for "the scanning electron microscope". Furthermore, a photograph imaged with the SEM is referred to as the SEM photograph sometimes. In the observation with the SEM, three viewing fields of each of the coarse particle zeolite and the fine particle zeolite are observed. That is, in the observation with the SEM, an observation to measure the average particle diameter of the particles of the coarse particle zeolite is performed as to three viewing fields each having a size including at least 100 particles of the coarse particle zeolite. Next, the size of the viewing field is changed, and an observation to measure the average particle diameter of the fine particle zeolite is performed as to three viewing fields each having a size including at least 100 particles of the fine particle zeolite. It is possible to specify whether the zeolite particle in the viewing field is the particle of the coarse particle zeolite or the particle of the fine particle zeolite, in accordance with a method which will be described later. Furthermore, in the above description, there has been described an example where the observation of the particles of the coarse particle zeolite is first performed, but the observation of the particles of the fine particle zeolite may be first performed.

Next, as to the zeolite particles in the image, long diameters and short diameters are measured, respectively, and arithmetic mean values of the long diameters and the short diameters are defined as the particle diameters of the zeolite particles. The long diameters and short diameters of the zeolite particles can be measured, for example, by an image analysis software. An example of the image analysis software includes "Image-Pro Plus (trade name)" manufactured by Media Cybernetics, Inc. For example, when the particle diameters of the particles of the coarse particle zeolite are measured, there are measured the particle diameters of 100 particles of the coarse particle zeolite which are present in each of the images of three viewing fields each including at least 100 particles of the coarse particle zeolite. Similarly, when the particle diameters of the particles of the fine particle zeolite are measured, there are measured the particle diameters of 100 particles of the fine particle zeolite which are present in each of the images of three viewing fields each including at least 100 particles of the fine particle zeolite. The average particle diameter of the coarse particle zeolite particles and the average particle diameter of the fine zeolite particles are arithmetic mean values calculated for each of the images of the three viewing fields.

It is to be noted that the zeolite particles in the SEM image can be discriminated by the following method. Here, in a case of a zeolite in which a type of coarse particle zeolite is different from that of fine particle zeolite, and in a case of a zeolite in which the type of coarse particle zeolite is the same as the type of fine particle zeolite, there are two discrimination methods.

First, there will be described the discrimination method of particles in the case of the zeolite in which the type of coarse particle zeolite is different from that of fine particle zeolite, i.e., a case where the fine particle zeolite is not the chabazite type zeolite. In this case, a crystal phase of the zeolite particle in the SEM image is specified by electron backscatter diffraction (EBSD), whereby the zeolite particles can be discriminated. Hereinafter, analysis by the electron backscatter diffraction will be referred to as "the EBSD analysis" sometimes. By this EBSD analysis, the zeolite particles in the image are classified into chabazite type zeolite particles and the other zeolite particles. Then, the particles classified as the chabazite type zeolite particles are conveniently defined as the coarse zeolite particles, and the other zeolite particles are conveniently defined as the fine zeolite particles.

Next, there will be described the discrimination method of particles in the case of the zeolite in which the type of coarse particle zeolite is the same as the type of fine particle zeolite, i.e., a case where the fine particle zeolite is the chabazite type zeolite. In this case, there are prepared SEM images for three viewing fields each including 100 or more zeolite particles in which the arithmetic mean value of the long diameters and short diameters is 2 μm or more. In the SEM images for the three viewing fields, the surface or the broken surface of the honeycomb structure body made of the zeolite material or a polished surface obtained by polishing the broken surface is measured in an optional region. Next, the long diameters and short diameters of all the zeolite particles in each SEM image are measured, respectively, and the arithmetic mean values of the long diameters and the short diameters of the respective zeolite particles are defined as the particle diameters of the respective zeolite particles. Additionally, in the measurement of the long diameter and the short diameter of each zeolite particle, the zeolite particle in which "the arithmetic mean value of the long diameter and the short diameter" is 0.001 μm or more is defined as a measurement target. When the long diameter and the short diameter of each zeolite particle are measured, a plurality of SEM images may separately be prepared in each of which an observation range is enlarged at an optional magnification. Further, the long diameter and the short diameter of the zeolite particle in the SEM image enlarged in accordance with a size of the zeolite particle are suitably measured, and the particle diameter of each zeolite particle may be obtained on the basis of the measured value.

Next, on the basis of the particle diameters of the zeolite particles which are obtained from the SEM images, a particle size distribution diagram is prepared in which the abscissa indicates "the particle diameters of the zeolite particles" and the ordinate indicates "the number of the zeolite particles". Then, it is confirmed whether the particle size distribution diagram shows a bimodal or more particle size distribution diagram. In a case of the distribution showing the bimodal distribution, the zeolite material includes the zeolite particles having relatively large particle diameters and the zeolite particles having relatively small particle diameters.

Next, in the particle size distribution, the particle diameter having a maximum frequency in a range of the particle diameters of 2 μm or more is defined as the average particle diameter of the coarse particle zeolite. Furthermore, in the particle size distribution, the particle diameter having a maximum frequency in a range of the particle diameters smaller than 2 μm is defined as the average particle diameter of the fine particle zeolite. Then, in the above particle size distribution diagram, the zeolite particles which comprise the distribution having the maximum frequency in the range of the particle diameters of 2 μm or more are conveniently defined as the coarse zeolite particles. Furthermore, in the above particle size distribution diagram, the zeolite particles which comprise the distribution having the maximum frequency in the range of the particle diameters smaller than 2 μm are conveniently defined as the fine zeolite particles.

Next, the type of zeolite is conveniently confirmed by the above-mentioned methods for the two cases as to the respective zeolite particles classified into the coarse zeolite particles and the fine zeolite particles. For example, as to all the zeolite particles in the SEM images, it is confirmed whether the type of zeolite is the chabazite type zeolite or not. In the confirmation of the type of zeolite, the crystal phase of zeolite can be specified by the above EBSD analysis or analysis with a transmission electron microscope (TEM). In the transmission electron microscope analysis, the zeolite material observed in the SEM image is processed into a thin specimen, and the processed thin specimen is analyzed by the selected area electron diffraction with the transmission electron microscope, whereby the crystal phase of zeolite can be specified. In this way, the average particle diameters of the coarse particle zeolite and the fine particle zeolite can be obtained.

It is to be noted that in a case where a volume ratio of each zeolite particle can be obtained in a raw material stage, the average particle diameters of the coarse zeolite particles and the fine zeolite particles can be measured in conformity with JIS R1629 by a laser diffraction scattering method. For example, the average particle diameter of the zeolite particles can be measured with "LA-920 (trade name)" which is a laser diffraction/scattering type particle size distribution measurement device manufactured by HORIBA, Ltd.

The pore volume ratio of the zeolite material can be measured by the following method. First, an accumulated pore volume of the honeycomb structure body made of the zeolite material is measured. The accumulated pore volume can be measured with a mercury porosimeter. An example of the mercury porosimeter includes "PoreMaster 60GT (trade name)" which is a fully automatic multifunctional mercury porosimeter manufactured by Quantachrome Instrument. For example, "the pore volume of the pores having the pore diameters of 0.02 to 0.15 µm" can be obtained by subtracting a value of the accumulated pore volume of the pores having the pore diameter of 0.02 µm from the value of the accumulated pore volume of the pores having the pore diameter of 0.15 µm. A pore volume of pores having another pore diameter can be also obtained by a similar method. Further, the pore volume ratio can be calculated as a percentage to the volume of all the pores.

It is preferable that in the zeolite material, the ratio of the volume of the pores having the pore diameters smaller than 0.02 µm to the volume of all the pores is from 8 to 20%. Then, it is further preferable that in the zeolite material, the ratio of the volume of the pores having the pore diameters in excess of 0.15 µm to the volume of all the pores is from 40 to 60%, and the ratio of the volume of the pores having the pore diameters of 0.52 µm or more to the volume of all the pores is 5% or less. Such a ratio enables the mechanical strength of the honeycomb structure to further increase.

In the honeycomb structure of the present embodiment, it is preferable that zeolite of at least a part of the coarse particle zeolite and the fine particle zeolite is copper ion-exchanged zeolite. That is, it is preferable that the zeolite of at least a part of the coarse particle zeolite and the fine particle zeolite is an ion-exchanged zeolite with the copper ions. The ion-exchanged zeolite particles with the copper ions can exhibit a suitable $NO_x$ purification performance, and furthermore, can exhibit a suitable hydrocarbon adsorption ability.

It is to be noted that there is not any special restriction on an ion exchange amount (M+/Al ion molar ratio) of the chabazite type zeolite with the copper ions, but it is preferable that the amount is from about 0.04 to 0.06. More specifically, the ion exchange amount of the chabazite type zeolite with the copper ions is preferably from 0.02 to 0.1, further preferably from 0.04 to 0.08, and especially preferably from 0.04 to 0.07. Furthermore, it is preferable that an ion exchange amount of a fine particle zeolite such as a β-type zeolite, a Y-type zeolite or a ZSM-5 type zeolite with the copper ions is about 0.8. More specifically, the ion exchange amount of the β-type zeolite, the Y-type zeolite or the ZSM-5 type zeolite with the copper ions is preferably from 0.4 to 1.5, further preferably from 0.6 to 1.2, and especially preferably from 0.7 to 1.0. It is to be noted that the ion exchange amount can be measured with, for example, an inductively coupled plasma mass spectrometer "SPQ9000 (trade name)" manufactured by Seiko Instruments, Inc. It is to be noted that the above-mentioned ion exchange amount is a molar ratio (M+/Al ions) of a valence number (M+) of the copper ions to aluminum ions (Al ions) in the zeolite. It is to be noted that when the ion exchange amount is small, a catalytic performance might deteriorate. On the other hand, when the ion exchange amount is excessively large, the catalytic performance might be saturated, and an effect due to the ion exchange might be hard to be exhibited. It is to be noted that the ion exchange amount can be indicated as a ratio (mass %) of a mass of the copper ions to a mass of the exchanged zeolite particles.

It is to be noted that in a case where the zeolite particles are ion-exchanged, the particles may be ion-exchanged in a state of a powder body before the particles are bonded by the bonding material, or the particles may be ion-exchanged in a state of the honeycomb structure after the particles are bonded by the bonding material. Additionally, a manufacturing process is simpler, and hence it is more preferable that the zeolite particles are ion-exchanged in the state of the powder body. That is, it is preferable that the zeolite particles are beforehand ion-exchanged in a state of the raw material.

There is not any special restriction on a type of chabazite type zeolite which is comprised the coarse particle zeolite, but it is preferable to use zeolite of at least one selected from the group consisting of chabazite, SAPO-34 and SSZ-13. It is to be noted that SAPO is an abbreviation for silico alumino phosphate.

There is not any special restriction on a type of zeolite which is comprised the fine particle zeolite, but it is preferable to use at least one selected from the group consisting of the β-type zeolite, the Y-type zeolite, the ZSM-5 type zeolite, and the chabazite type zeolite. The use of the above zeolite as the fine particle zeolite is preferable in that the $NO_x$ purification performance can be maintained to be high in a broad temperature range.

There is not any special restriction on a ratio between the coarse particle zeolite and the fine particle zeolite. For example, a value of a ratio represented by "a volume of the coarse particle zeolite:a volume of the fine particle zeolite" is preferably from 20:80 to 90:10, and further preferably from 30:70 to 75:25. The ratio between the coarse particle zeolite and the fine particle zeolite can be obtained from the SEM image used in obtaining the particle diameters of the zeolite particles.

Furthermore, as to zeolite particles in each of which the arithmetic mean value of the long diameter and the short diameter is 2 µm or more, its volume ratio to a total volume of the zeolite particles is preferably from 10 to 95 vol % and further preferably from 15 to 87 vol %. The volume ratio of the zeolite particles in each of which the arithmetic mean value of the long diameter and the short diameter is 2 µm or more can be also obtained from the SEM image used in obtaining the particle diameters of the zeolite particles.

The inorganic bonding material is a bonding material to bond the hitherto described zeolite particles to one another. Suitable examples of the inorganic bonding material include alumina, silica, and montmorillonite. Examples of alumina include boehmite, and alumina sol. An example of silica includes silica sol. Especially in the honeycomb structure of the present embodiment, it is more preferable that the inorganic bonding material includes at least alumina derived from basic aluminum lactate. The inorganic bonding material includes alumina derived from basic aluminum lactate, and hence, the agglomerating properties of the inorganic bonding material improve, and the pore volume ratio of the pores having the pore diameters of 0.02 to 0.15 μm can be set to 42% or less.

It is more preferable that the zeolite material includes 3 vol % or more of the inorganic bonding material in a total volume of the zeolite material, and this inorganic bonding material includes 1 vol % or more of alumina derived from basic aluminum lactate to the total volume of the zeolite material. Such a ratio enables the mechanical strength of the honeycomb structure to further improve. Hereinafter, a ratio of a volume of the inorganic bonding material in the total volume of the zeolite material will be referred to as the volume ratio of the inorganic bonding material sometimes.

The volume ratio of the inorganic bonding material can be calculated from the SEM photograph used in obtaining, for example, the above-mentioned "average particle diameter of the zeolite particles". That is, the particle diameters or an occupying area of the zeolite particles, and an occupying area of the inorganic bonding material are obtained from the above-mentioned SEM photograph by using an image analysis software, and from these values, a volume of all the zeolite particles, and the volume of the inorganic bonding material can be calculated. Furthermore, in a case where the zeolite material includes an inorganic fiber or another component, a volume of the other component is also calculated by a method similar to the above-mentioned method. As the image analysis software, for example, "Image-Pro Plus (trade name)" manufactured by Media Cybernetics, Inc. can be used. Here, "the volume of all the zeolite particles" means a total value of the volumes of the respective zeolite particles, i.e., a volume which does not include the clearances (voids) among the zeolite particles. Therefore, a total of "the volume of all the zeolite particles" which is obtained from the particle diameters of the zeolite particles, "the volume of the inorganic bonding material" which is obtained from the occupying area of the inorganic bonding material, and "the volume of the other component" becomes a value of "a denominator" in the volume ratio of the inorganic bonding material. That is, the volume ratio of the inorganic bonding material can be represented by Equation (1) mentioned below. It is to be noted that, for example, in a case of powder of particles used as the raw material, the volume of all the zeolite particles is a value obtained by dividing a mass of all the zeolite particles by a density thereof. Furthermore, another component such as the inorganic fiber to be included in the zeolite material is an optional component, and hence, in a case where the zeolite material does not include the other component, the volume of the component does not have to be taken into consideration in Equation (1) mentioned below. An example of the other component includes the inorganic fiber as described above.

the ratio of the volume of the inorganic bonding material={(the volume of the inorganic bonding material)/(the volume of all the zeolite particles+the volume of the inorganic bonding material+the volume of the other component)}    Equation (1):

In the honeycomb structure of the present embodiment, it is more preferable that the zeolite material includes 3 vol % or more of the inorganic bonding material in the total volume of the zeolite material, and the inorganic bonding material includes 1 vol % or more of alumina derived from basic aluminum lactate to the total volume of the zeolite material. Such a ratio enables an effect of improving the mechanical strength of the honeycomb structure due to alumina derived from basic aluminum lactate to be suitably exhibited.

Furthermore, in the honeycomb structure of the present embodiment, the inorganic bonding material may further include alumina derived from a raw material other than basic aluminum lactate. For example, the inorganic bonding material may include alumina derived from basic aluminum lactate and alumina derived from boehmite. In this case, it is preferable that a value of A1/A2 which is a ratio of a volume A1 of alumina derived from basic aluminum lactate to a volume A2 of alumina derived from boehmite is 0.6 or more. When the value of A1/A2 is 0.6 or more, the effect of improving the mechanical strength of the honeycomb structure suitably is exhibited due to the high agglomerating properties of alumina derived from basic aluminum lactate. The value of the ratio (A1/A2) of the volumes of alumina derived from basic aluminum lactate and alumina derived from boehmite can be obtained, for example, by measuring respective masses in a stage of the zeolite raw material during the manufacturing of the honeycomb structure and converting the respective masses.

Furthermore, in the honeycomb structure of the present embodiment, the zeolite material which is comprised the honeycomb structure body may include at least one selected from the group consisting of inorganic fibers such as an alumina fiber, a silica alumina fiber and a glass fiber. Including such inorganic fibers enables the mechanical strength of the honeycomb structure to improve.

In a case where the zeolite material includes the inorganic fiber, the volume ratio of the inorganic fiber in the total volume of the zeolite material is more preferably from 3 to 8 vol %. When the volume ratio of the inorganic fiber is smaller than 3 vol %, the strength improving effect due to the inclusion of the inorganic fiber is not sufficiently exhibited. On the other hand, when the volume ratio of the inorganic fiber is in excess of 8 vol %, amounts of the zeolite particles and the inorganic bonding material decrease, and a deterioration of the $NO_x$ purification performance or a decrease of the mechanical strength might occur. The volume ratio of the inorganic fiber can be calculated from the SEM photograph used in obtaining the above-mentioned "average particle diameter of the zeolite particles". The calculation of the volume ratio of the inorganic fiber can be performed in conformity with a calculating method of the volume ratio of the inorganic bonding material.

The honeycomb structure of the present embodiment is formed by extruding the zeolite raw material containing two types of zeolite particles and the inorganic bonding material which have hitherto been described, and becomes the porous body obtained by bonding a plurality of zeolite particles by the inorganic bonding material.

It is to be noted that it is necessary to consider values of a porosity and pore diameters of the honeycomb structure of the present embodiment in two viewpoints. A first viewpoint is that particles of zeolite comprise a substance having pores as a crystal structure, and hence, values are specific to a type of zeolite, directed to the pores and determined when the type of zeolite is determined. For example, in the case of the chabazite type zeolite, the honeycomb structure has the three-dimensional pore structure of the oxygen 8-membered ring, and the pore diameters are about 0.38 nm. A second viewpoint is that in the honeycomb structure, the zeolite particles are integrated with the inorganic bonding material, and hence, the porosity and pore diameters are values of the porous body. In the honeycomb structure of the present embodiment, in a case where the porosity and pore diameters are described, the porosity and pore diameters of the porous body in the second viewpoint are meant unless otherwise specified.

In the honeycomb structure of the present embodiment, the porosity is preferably from 25 to 50%, further preferably from 30 to 45%, and especially preferably from 30 to 42%. When the porosity is excessively low, the purification performance might deteriorate, and on the other hand, when the porosity is excessively high, the strength might decrease. It is to be noted that the porosity is a value calculated in Equation (2) mentioned below by use of the pore volume per unit mass of the pores having pore diameters of 3 nm to 180 µm which are measured by mercury penetration method and a true density of the honeycomb structure body.

$$\text{the porosity} = \text{the pore volume}/(\text{the pore volume} + 1/\text{the true density of the honeycomb structure body}) \times 100 \quad \text{Equation (2)}$$

It is to be noted that in Equation (2) mentioned above, the pore volume is a value measured with "PoreMaster 60GT (trade name)" which is the fully automatic multifunctional mercury porosimeter manufactured by Quantachrome Instrument. Furthermore, as the true density of the honeycomb structure body concerning zeolite, a value of 1.85 g/cm$^3$ is used, and as the true density concerning the inorganic bonding material, there is used a value measured with "AccuPyc 1330 (trade name)" which is a dry process automatic densimeter manufactured by Micrometrics.

It is preferable that the honeycomb structure is formed by an extrusion and there is not any special restriction on a shape of the honeycomb structure. As shown in FIG. 1, it is preferable that the honeycomb structure has a pillar shape in the form of a honeycomb including the partition walls 1 defining the plurality of cells 2 which become the through channels for the fluid and extend from the first end face 11 to the second end face 12.

The honeycomb structure can be suitably used as an exhaust gas purification member to purify NO$_x$ and the like contained in an exhaust gas emitted from a car engine, a construction machine engine, an industrial stationary engine, a combustion device or the like or to adsorb hydrocarbons and the like.

It is preferable that an area of a cross section of the honeycomb structure which is perpendicular to a cell extending direction is from 300 to 200000 mm$^2$. When the area is smaller than 300 mm$^2$, an area which can treat the exhaust gas decreases, and additionally, a pressure loss might increase. When the area is larger than 200000 mm$^2$, the strength of the honeycomb structure might decrease.

Furthermore, as shown in FIG. 1, it is preferable that the honeycomb structure of the present embodiment includes the circumferential wall 3 disposed to surround a circumference of all of the partition walls 1. A material of the circumferential wall 3 does not necessarily have to be the same as that of the partition walls. However, when a material of a circumferential portion is noticeably different in viewpoints of a heat resistance, a thermal expansion coefficient and the like, problems such as damages on the partition walls might occur, and hence it is preferable to mainly include the same material or to mainly contain a material having equivalent physical properties. The circumferential wall may be formed integrally with the partition walls by the extrusion, or after the formation, the circumferential portion may be processed into a desired shape and the circumferential portion may be coated.

There is not any special restriction on a shape of the cells in the honeycomb structure, and examples of the cell shape include a triangular shape, a quadrangular shape, a hexagonal shape, an octagonal shape, a round shape, and any combination of these shapes. The shape of the cells means a shape of the cells in the cross section perpendicular to the extending direction of the cells.

A thickness of the partition walls in the honeycomb structure is preferably from 50 µm to 2 mm and further preferably from 100 µm to 350 µm. When the thickness is smaller than 50 µm, the strength of the honeycomb structure might decrease. When the thickness is larger than 2 mm, the purification performance might deteriorate, or the pressure loss might increase when the gas passes through the honeycomb structure. Furthermore, it is preferable that a thickness of the circumferential wall forming the outermost circumference of the honeycomb structure is 10 mm or less. When the thickness is larger than 10 mm, the area to perform the exhaust gas purification treatment might decrease.

For example, a cell density of the honeycomb structure is preferably from 7.8 to 155.0 cells/cm$^2$ and further preferably from 31.0 to 93.0 cells/cm$^2$. When the cell density is larger than 155.0 cells/cm$^2$, the pressure loss might increase when the gas passes through the honeycomb structure. When the cell density is smaller than 7.8 cells/cm$^2$, the area to perform the exhaust gas purification treatment might decrease.

An example of the whole shape of the honeycomb structure is a pillar shape in which each end face has a round shape, an oval shape, or the like. For example, as a size of the honeycomb structure in the case of the round pillar shape, a diameter of a bottom surface is preferably from 20 to 500 mm and further preferably from 70 to 300 mm. Furthermore, a length of the honeycomb structure in a central axis direction is preferably from 10 to 500 mm, and further preferably from 30 to 300 mm.

(2) Manufacturing Method of Honeycomb Structure:

Next, a manufacturing method of the honeycomb structure of the present invention will be described.

It is preferable that the manufacturing method of the honeycomb structure includes a step A of preparing a zeolite raw material, a step B of extruding the zeolite raw material to form a honeycomb formed body, and a step C of firing the obtained honeycomb formed body to prepare the honeycomb structure made of zeolite.

In the step A of preparing the zeolite raw material, there are prepared coarse zeolite particles made of a chabazite type zeolite in which an average particle diameter of primary particles is 2 µm or more and 6 µm or less, and fine zeolite particles in which an average particle diameter of the primary particles is 0.02 µm or more and smaller than 2 µm. Furthermore, a raw material of an inorganic bonding material which is fired to become the inorganic bonding material is prepared. A suitable example of the raw material of the inorganic bonding material is basic aluminum lactate. As the raw material of the inorganic bonding material, basic aluminum lactate and boehmite may be used.

Next, it is preferable that the coarse zeolite particles, the fine zeolite particles, the raw material of the inorganic bonding material and an organic binder are mixed to prepare the zeolite raw material. Amounts of the coarse zeolite particles, fine zeolite particles, the raw material of the inorganic bonding material and organic binder to be blended can be suitably adjusted. In a case of using the raw material of the inorganic bonding material containing at least basic aluminum lactate, it is preferable that to 100 parts by mass of a total mass of the coarse zeolite particles and the fine zeolite particles, 10 to 35 parts by mass of basic aluminum lactate is added as the raw material of the inorganic bonding material, to prepare the zeolite raw material. It is to be noted that when masses of the coarse particle zeolite and the fine particle zeolite are measured, the coarse particle zeolite and fine particle zeolite used are beforehand dried at 200° C. in a drying chamber for 5 hours, and returned to room temperature in a drying atmosphere, and then the masses are immediately measured.

In the step A of preparing the zeolite raw material, it is more preferable that a mass ratio of basic aluminum lactate in the raw material of the inorganic bonding material is from 65 to 100 mass %. Furthermore, in a case of further using boehmite as the raw material of the inorganic bonding material in addition to basic aluminum lactate, it is preferable that the mass ratio of basic aluminum lactate in the raw material of the inorganic bonding material is from 65 to 90 mass % and a mass ratio of boehmite is from 10 to 35 mass %. Such a ratio enables agglomerating properties of the inorganic bonding material formed from the raw material of the inorganic bonding material to improve in the honeycomb structure to be manufactured, and a pore volume ratio of the pores having the pore diameters of 0.02 to 0.15 µm to set to 42% or less. Here, basic aluminum lactate is referred to as a compound represented by a chemical formulation of $[Al(OH)_{3-n}(C_3H_5O_3)_n] \cdot mH_2O$. Furthermore, the mass of basic aluminum lactate is referred to as a mass of $[Al(OH)_{3-n}(C_3H_5O_3)_n] \cdot mH_2O$ (provided that $0 < n < 3$ and $1 \leq m \leq 5$).

Alternatively, basic aluminum lactate of the raw material of the inorganic bonding material may be dissolved in water, and basic aluminum lactate dissolved in water may be mixed with the coarse zeolite particles and the fine zeolite particles to prepare the zeolite raw material. In this case, it is more preferable to dissolve basic aluminum lactate of the raw material of the inorganic bonding material in an amount of water which corresponds to twice or more as much as the mass of basic aluminum lactate.

Furthermore, the zeolite particles of at least a part of the coarse zeolite particles and the fine zeolite particles may be subjected to an ion exchange treatment with the copper ions. Using such zeolite particles enables the honeycomb structure excellent in catalyst function to be simply manufactured. It is to be noted that it is also possible to perform the ion exchange treatment after the honeycomb structure is manufactured.

It is to be noted that an example of a method of subjecting the zeolite particles or the honeycomb structure to the ion exchange treatment with the copper ions includes the following method.

First, an ion exchanging solution containing the copper ions to perform ion exchange is prepared. Specifically, an aqueous solution of copper acetate, copper sulfate or copper nitrate is prepared. It is preferable that a concentration of the ion exchanging solution is from 0.005 to 0.5 (mols/liter). Then, the zeolite particles are immersed into the ion exchanging solution. An immersion time can be suitably determined in accordance with an amount of the copper ions to perform the ion exchange, or the like. Then, the zeolite particles are removed from the ion exchanging solution, followed by drying and calcinating, so that the ion-exchanged zeolite particles can be obtained. As preferable drying conditions, the drying is performed at 80 to 150° C. for 1 to 10 hours. As preferable calcinating conditions, the calcinating is performed at 400 to 600° C. for 1 to 10 hours. Afterward, the inorganic bonding material is further added to the obtained zeolite particles, thereby preparing the zeolite raw material.

It is preferable that the zeolite raw material contains water. A content of the water in the zeolite raw material is preferably from 30 to 70 parts by mass to 100 parts by mass of the zeolite particles. It is to be noted that a part of the water to be contained in the zeolite raw material may be water to dissolve basic aluminum lactate.

Furthermore, it is preferable to contain the organic binder in the zeolite raw material. Examples of the organic binder include methylcellulose, hydroxypropylmethylcellulose, hydroxypropylethylcellulose, hydroxyethylcellulose, carboxymethylcellulose, and polyvinyl alcohol.

It is to be noted that an amount of the organic binder to be added is preferably from 1 to 20 parts by mass, further preferably from 4 to 15 parts by mass, and especially preferably 6 to 12 parts by mass to 100 parts by mass of the total mass of the zeolite particles and the raw material of the inorganic bonding material. When the amount of the organic binder to be added is excessively small, the extrusion might become difficult, and when the amount of the organic binder is excessively large, the porosity of the honeycomb structure to be obtained might increase, and the strength might decrease.

Furthermore, the zeolite raw material may further contain a dispersing agent. Examples of the dispersing agent include a fatty acid, an acrylic acid, a sorbitan acid, and polyalcohol.

There is not any special restriction on a method of mixing the zeolite particles and the inorganic bonding material, and a known method can be employed. For example, an example of the method is a method of performing the mixing and kneading by use of a double arm kneader manufactured by Honda Machinery Works Co., Ltd.

Next, the obtained zeolite raw material is extruded into a predetermined shape, to form the honeycomb formed body. For example, it is preferable that the zeolite raw material is first kneaded to form a round pillar-shaped formed body, and the round pillar-shaped formed body is extruded to form the honeycomb formed body made of the zeolite raw material. There is not any special restriction on a method of kneading the zeolite raw material to form the round pillar-shaped formed body, and an example of the method includes a method of using a kneader, a vacuum pugmill or the like. During the extrusion, it is preferable to use a die having a desired whole shape, cell shape, partition wall thickness, cell density and the like. As a material of the die, a metal which is hard to wear is preferable.

It is preferable to dry the obtained honeycomb formed body before firing the body. There is not any special restriction on a drying method, and examples of the method include an electromagnetic heating method such as microwave heating drying or high-frequency induction heating drying, and an external heating method such as hot air drying or superheated steam drying. Among these methods, such a drying method as described below is more preferable in that the whole formed body can rapidly and uniformly be dried to prevent cracks from being generated. First, a certain amount of water in the honeycomb formed body is dried by the electromagnetic heating method. Afterward, the residual water in the honeycomb formed body is dried by the external heating method.

Then, it is preferable to calcinate the honeycomb formed body before firing the honeycomb formed body. The calcinating is performed for degreasing, and there is not any special restriction on a calcinating method as long as organic substances such as the organic binder and the dispersing agent can be removed. As preferable calcinating conditions, heating is performed at about 200 to 500° C. in an oxidation atmosphere for about 1 to 20 hours.

Next, the honeycomb formed body is fired to obtain the honeycomb structure of a predetermined shape. Therefore, "the fired honeycomb formed body" means "the honeycomb structure". There is not any special restriction on a firing method, and the firing can be performed by using an electric furnace, a gas furnace, or the like. It is to be noted that a firing temperature is preferably from 500 to 750° C., and further preferably from 550 to 700° C. In a case where the firing temperature is excessively low, the strength might decrease, and in a case where the temperature is excessively high, a zeolite performance might deteriorate. Furthermore, as preferable firing conditions during the firing, heating is performed at the above temperature in the air atmosphere for 1 to 10 hours.

As described above, the honeycomb structure of the present invention can be manufactured. It is to be noted that in a case where the ion-exchanged zeolite particles are not used as the zeolite particles, the fired honeycomb formed body may be subjected to an ion exchange treatment with metal ions. Additionally, the hitherto described manufacturing method of the honeycomb structure is one example, and the honeycomb structure may be manufactured by a method other than the above-mentioned manufacturing method.

EXAMPLES

Hereinafter, the present invention will further specifically be described with reference to examples, but the present invention is not limited to these examples.

Example 1

As a coarse particle zeolite, there was prepared SAPO-34 which was 4.1 mass % ion-exchanged with copper ions and in which an average particle diameter was 3.9 μm. Furthermore, as a fine particle zeolite, there was prepared a β-type zeolite which was 6.3 mass % ion-exchanged with copper ions and in which an average particle diameter was 0.4 μm. Table 1 shows the types and average particle diameters of the coarse particle zeolite and the fine particle zeolite used in Example 1. In "a column of zeolite" of Table 1, "Cu-SAPO-34" means SAPO-34 which was ion-exchanged with the copper ions. Furthermore, in "the column of zeolite" of Table 1, "Cu-n" means the β-type zeolite which was ion-exchanged with the copper ions. The average particle diameter of each zeolite was a median diameter (d50) in a particle diameter distribution of powder containing particles of each zeolite, and was measured by a laser diffraction scattering method which conformed to JIS R1629.

Furthermore, as an inorganic bonding material, 155 g of basic aluminum lactate and 49 g of boehmite were prepared. As basic aluminum lactate, there was prepared "M160-P (trade name)" which was basic aluminum lactate manufactured by Taki Chemical Co., Ltd. Boehmite having a specific surface area of 130 m$^2$/g was prepared. Basic aluminum lactate was dissolved in an amount of water which was twice as much as a mass of basic aluminum lactate, i.e., 310 g of water.

Furthermore, an alumina silica fiber and methylcellulose were added to the coarse particle zeolite, the fine particle zeolite and the inorganic bonding material prepared as described above, to prepare a zeolite raw material. When preparing the zeolite raw material, 73 g of alumina silica fiber was added, and 35 g of methylcellulose was added. The alumina silica fiber was used in which an average fiber diameter was 3 μm and an average fiber length was 100 μm. The preparation of the zeolite raw material was performed by mixing the above-mentioned respective raw materials by using a double arm kneader manufactured by Honda Machinery Works Co., Ltd. for 10 minutes, and further performing mixing and kneading for 40 minutes while adding water to adjust a viscosity. Table 2 shows a formulation of the zeolite raw material.

An obtained kneaded material of zeolite was extruded to obtain a honeycomb formed body in which a thickness of partition walls was 200 μm and a cell density was 93 cells/cm$^2$. The obtained honeycomb formed body was dried at 80° C. in a hot air drier for 12 hours. Afterward, the dried honeycomb formed body was degreased at 450° C. in a firing furnace for 5 hours, and fired at 700° C. for 4 hours, thereby to obtain a honeycomb structure including a honeycomb structure body made of a zeolite material.

As to the zeolite material which is comprised the honeycomb structure body of the obtained honeycomb structure, measurements of (1) to (10) mentioned below were performed. Table 4 shows the measurement results.

(1) A ratio (%) of a volume of the coarse particle zeolite (a coarse particle chabazite type zeolite) to a volume of the whole zeolite material.

(2) A ratio (vol %) of a volume of alumina derived from basic aluminum lactate to the volume of the whole zeolite material.

(3) A ratio (vol %) of a volume of the inorganic bonding material to the volume of the whole zeolite material.

(4) A ratio (A1/A2) of a volume A1 of alumina derived from basic aluminum lactate to a volume A2 of alumina derived from boehmite.

(5) A pore volume ratio (%) of pores having pore diameters of 0.02 to 0.15 μm.

(6) A pore volume ratio (%) of pores having pore diameters of 0.02 μm or less.

(7) A pore volume ratio (%) of pores having pore diameters of 0.15 μm or more.

(8) A pore volume ratio (%) of pores having pore diameters of 0.52 μm or more.

(9) A porosity (%).

(10) A compressive strength (MPa).

The measurements of the above-mentioned (1) to (4) were performed by the following method. First, a surface of the honeycomb structure body made of the zeolite material was observed with SEM and an observed image was imaged. The observations with the SEM were performed in three viewing fields each having a size including at least 100 particles of the coarse particle zeolite and three viewing fields each having a size including at least 100 particles of the fine particle zeolite, respectively. Additionally, types of zeolite particles in each viewing field were discriminated by a method which will be described later. Next, particle diameters of the zeolite particles in each image were obtained. The particle diameters of the zeolite particles were values obtained as arithmetic mean values of the long diameters and short diameters after long diameters and short diameters of the respective zeolite particles had been measured. The measurement of the long diameters and the short diameters of the zeolite particles was performed by using an image analysis software. As the image analysis software, "Image-Pro Plus (trade name)" manufactured by Media Cybernetics, Inc. was used.

Next, elements which is comprised the zeolite particles in the images observed with the SEM were specified by using an energy dispersive X-ray analyzer, and the zeolite particles in the images were classified into phosphate-based zeolite particles of the coarse particle zeolite and β-type zeolite particles of the fine particle zeolite. Furthermore, in Example 9 which will be described later, the zeolite particles were classified into chabazite particles of the coarse particle zeolite and the β-type zeolite particles of the fine particle zeolite. Furthermore, in Example 10 which will be described later, a particle size distribution diagram was prepared on the basis of the particle diameters of the zeolite particles which were obtained from the SEM images, to classify zeolite into the coarse particle zeolite and the fine particle zeolite as described above.

Then, volumes of the coarse zeolite particles were obtained from particle diameters of the particles classified as the coarse zeolite particles. A sum of the volumes of the coarse zeolite particles was the volume of the coarse particle zeolite included in the zeolite material in the SEM image. Furthermore, volumes of the fine zeolite particles were obtained from particle diameters of the particles classified as the fine zeolite particles. A sum of the volumes of the fine zeolite particles was the volume of the fine particle zeolite included in the zeolite material in the SEM image. Furthermore, on the basis of values of "the particle diameters of the zeolite particles" obtained beforehand, the average particle diameter of the coarse zeolite particles and the average particle diameter of the fine zeolite particles were separately obtained. The average particle diameter was an arithmetic mean value calculated for the images of the three viewing fields.

Furthermore, an occupying area of the inorganic bonding material in the image observed with the SEM was obtained, and from this value, a volume of the inorganic bonding material was calculated.

A sum of the volume of the coarse particle zeolite, the volume of the fine particle zeolite and the volume of the inorganic bonding material which were obtained as described above was obtained as a total volume of the zeolite material, and ratios of the respective components were calculated, thereby obtaining the respective volume ratios (vol %). Additionally, the values of the above (2) and (4) were values partially calculated on the basis of amounts of basic aluminum lactate and boehmite to be added as shown in Table 2.

The measurements of the above-mentioned (5) to (8) were performed by the following method. First, an accumulated pore volume of the honeycomb structure body made of the zeolite material was measured with a mercury porosimeter. As the mercury porosimeter, there was used "PoreMaster 60GT (trade name)" of a fully automatic multifunctional mercury porosimeter manufactured by Quantachrome Instrument. Then, for example, "the pore volume of the pores having the pore diameters of 0.02 to 0.15 μm" was obtained by subtracting a value of the accumulated pore volume of the pores having the pore diameter of 0.02 μm from the value of the accumulated pore volume of the pores having the pore diameter of 0.15 μm. A pore volume of pores having another pore diameter was also obtained by a similar method. Further, each pore volume ratio was calculated as a percentage to the volume of all the pores.

The measurement of the above-mentioned (9) was performed by the following method. First, the porosity was calculated in Equation (3) mentioned below by use of a pore volume per unit mass of pores having pore diameters of 3 nm to 180 μm which was measured by mercury penetration method and a true density of the honeycomb structure.

$$\text{the porosity} = \text{the pore volume}/(\text{the pore volume} + 1/\text{the true density of the honeycomb structure body}) \times 100 \qquad \text{Equation (3):}$$

Furthermore, in Equation (3) mentioned above, the pore volume was measured with "PoreMaster 60GT (trade name)" of the fully automatic multifunctional mercury porosimeter manufactured by Quantachrome Instrument. Furthermore, as the true density of the honeycomb structure body concerning zeolite, a value of 1.85 g/cm$^3$ was used, and as the true density concerning the inorganic bonding material, there was used a value measured with "AccuPyc 1330 (trade name)" of a dry process automatic densimeter manufactured by Micrometrics.

The measurement of the above-mentioned (10) was performed by the following method. From the honeycomb structure, a round pillar shape having a diameter of 25 mm and a length of 25 mm in a cell extending direction was cut out as a test piece. In "Auto Graph AG10TD (trade name)" manufactured by Shimadzu Corporation, a compressive load was applied at a test rate (a crosshead feed rate) of 0.5 mm/minute, to measure a maximum load of the test piece. A value obtained by dividing the measured maximum load by a cross-sectional area of the test piece (a cross-sectional area of the round pillar shape having a diameter of 25 mm) was obtained as the compressive strength (MPa). Additionally, the measurement was performed by sandwiching a cardboard between a jig used in measuring the maximum load and a contact surface of the test piece for the purpose of relieving a local load.

TABLE 1

| Type of zeolite | | Average particle dia. (μm) |
|---|---|---|
| Coarse particle zeolite | Cu-SAPO-34 | 3.9 |
| | Coarse particle Cu-chabazite | 4.4 |
| Fine particle zeolite | Cu-β | 0.4 |
| | Fine particle Cu-chabazite | 0.6 |

TABLE 2

| (g) | Example 1 | Example 2 | Example 3 | Example 4 | Example 5 | Example 6 | Example 7 | Example 8 | Example 9 | Example 10 |
|---|---|---|---|---|---|---|---|---|---|---|
| Cu-SAPO-34 | 158 | 158 | 158 | 158 | 315 | 158 | 158 | 315 | — | — |
| Coarse particle Cu-chabazite | — | — | — | — | — | — | — | — | 158 | 158 |
| Cu-β | 293 | 293 | 293 | 293 | 135 | 293 | 293 | 135 | 293 | — |
| Fine particle Cu-chabazite | — | — | — | — | — | — | — | — | — | 293 |
| Aluminum lactate | 155 | 101 | 67 | 51 | 69 | 104 | 86 | 68 | 67 | 67 |
| Boehmite | 49 | — | 11 | 22 | 34 | 34 | 28 | 17 | 11 | 11 |
| Alumina silica fiber | 73 | 24 | 24 | 24 | 25 | 25 | 25 | 25 | 24 | 24 |
| Methylcellulose | 35 | 31 | 35 | 31 | 32 | 65 | 64 | 62 | 35 | 35 |

TABLE 3

| (g) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Cu-SAPO-34 | 158 | 158 | 315 | 315 | 158 | 158 | 158 |
| Cu-β | 293 | 293 | 135 | 135 | 293 | 293 | 293 |
| Aluminum lactate | — | — | — | — | — | — | — |
| Alumina sol | 200 | — | 92 | — | 97 | 136 | 184 |
| Boehmite | 49 | 33 | 34 | 56 | 35 | 11 | 23 |
| Alumina silica fiber | 73 | 24 | 25 | 25 | 70 | 25 | 25 |
| Methylcellulose | 34 | 30 | 32 | 64 | 63 | 41 | 64 |

TABLE 4

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Volume ratio (vol %) of coarse particle chabazite type zeolite | 35 | 35 | 35 | 35 | 70 | 35 | 35 | 70 | 35 | 35 |
| Volume ratio (vol %) of alumina derived from aluminum lactate to volume of whole zeolite material | 4 | 3 | 2 | 1.5 | 2 | 3 | 2.5 | 2 | 2 | 2 |
| Volume ratio (vol %) of inorganic bonding material to volume of whole zeolite material | 8 | 3 | 3 | 3.5 | 5 | 6 | 5 | 3.5 | 3 | 3 |
| Ratio (A1/A2) of volume A1 of alumina derived from aluminum lactate to volume A2 of alumina derived from boehmite | 1 | — | 2 | 0.75 | 0.67 | 1 | 1 | 1.33 | 2 | 2 |
| Pore volume ratio (%) of pores having pore diameters of 0.02 to 0.15 μm | 39 | 30 | 35 | 41 | 26 | 39 | 39 | 28 | 34 | 36 |
| Pore volume ratio (%) of pores having pore diameters of 0.02 μm or less | 16 | 13 | 10 | 10 | 16 | 13 | 20 | 18 | 11 | 10 |
| Pore volume ratio (%) of pores having pore diameters of 0.15 μm or more | 45 | 57 | 55 | 49 | 58 | 48 | 41 | 53 | 55 | 54 |
| Pore volume ratio (%) of pores having pore diameters of 0.52 μm or more | 4 | 3 | 2 | 2 | 4 | 4 | 3 | 3 | 2 | 3 |
| Porosity (%) | 36 | 38.1 | 41 | 42.3 | 30.5 | 38.2 | 32.3 | 36.3 | 39.8 | 41.5 |
| Compressive strength (MPa) | 17 | 19.1 | 11.2 | 5.3 | 18.5 | 6.3 | 5.7 | 17.2 | 13.4 | 12.1 |

TABLE 5

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Volume ratio (vol %) of coarse particle chabazite type zeolite | 35 | 35 | 70 | 70 | 35 | 35 | 35 |
| Volume ratio (vol %) of alumina derived from aluminum lactate to volume of whole zeolite material | — | — | — | — | — | — | — |
| Volume ratio (vol %) of inorganic bonding material to volume of whole zeolite material | 8 | 3 | 5 | 5 | 5 | 4 | 6 |
| Ratio (A1/A2) of volume A1 of alumina derived from aluminum lactate to volume A2 of alumina derived from boehmite | — | — | — | — | — | — | — |
| Pore volume ratio (%) of pores having pore diameters of 0.02 to 0.15 μm | 74 | 86 | 63 | 43 | 51 | 48 | 43 |
| Pore volume ratio (%) of pores having pore diameters of 0.02 μm or less | 23 | 10 | 27 | 12 | 8 | 13 | 22 |
| Pore volume ratio (%) of pores having pore diameters of 0.15 μm or more | 3 | 4 | 10 | 44 | 41 | 39 | 47 |
| Pore volume ratio (%) of pores having pore diameters of 0.52 μm or more | 2 | 2 | 4 | 3 | 6 | 3 | 2 |
| Porosity (%) | 41.8 | 42.3 | 33.7 | 36.6 | 39.2 | 34.2 | 35.6 |
| Compressive strength (MPa) | 3.5 | 1.7 | 3.8 | 1.7 | 2.5 | 1.9 | 3.2 |

Examples 2 to 8

The procedure of Example 1 was repeated except that a formulation of a zeolite raw material was changed as shown in Table 2, to manufacture honeycomb structures. Additionally, in Examples 2 to 8, aluminum lactate was dissolved in a mass of water which was twice as much as a mass of aluminum lactate, and used.

Example 9

The formulation and method of Example 3 were used except that as a coarse particle zeolite, there was used chabazite which was 5.0 mass % ion-exchanged with copper ions and in which an average particle diameter was 4.4 μm, to manufacture a honeycomb structure.

Example 10

The formulation and method of Example 9 were used except that as a fine particle zeolite, there was used chabazite which was 5.0 mass % ion-exchanged with copper ions and in which an average particle diameter was 0.6 μm, to manufacture a honeycomb structure.

Comparative Examples 1 to 7

The procedure of Example 1 was repeated except that a formulation of a zeolite raw material was changed as shown in Table 3, to manufacture honeycomb structures. Additionally, in Comparative Examples 1, 3 and 5 to 7, as an inorganic bonding material, an alumina sol was used. As the alumina sol, "AS520 (trade name)" of an alumina sol manufactured by Nissan Chemical Industries, Ltd. was used.

As to a zeolite material which is comprised a honeycomb structure body of the honeycomb structure of each of Examples 2 to 10 and Comparative Examples 1 to 7, the measurements of the above-mentioned (1) to (10) were performed. Table 4 or Table 5 shows the measurement results.

Figure 8:
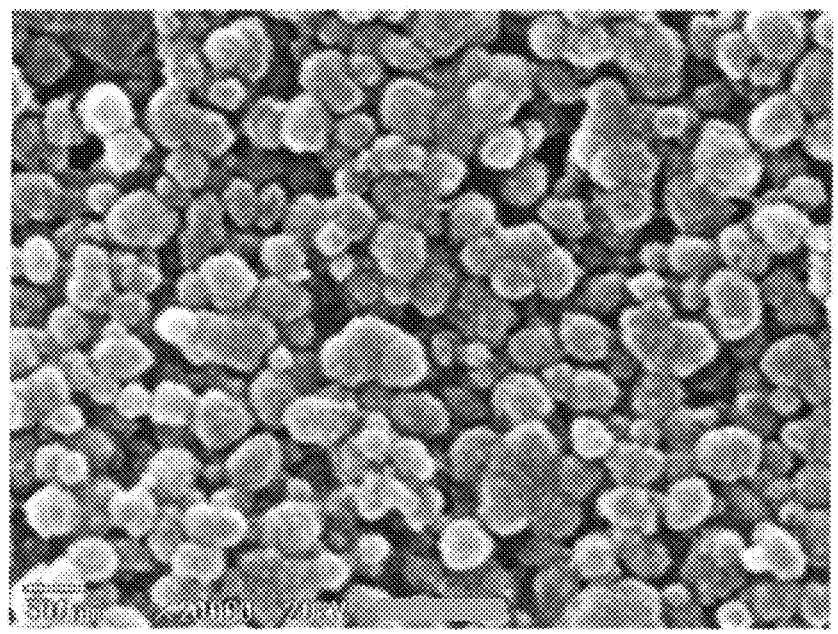
FIG. 8 is an SEM image of a zeolite material which is comprised a honeycomb structure body of a honeycomb structure of Example 1.
Figure 9:
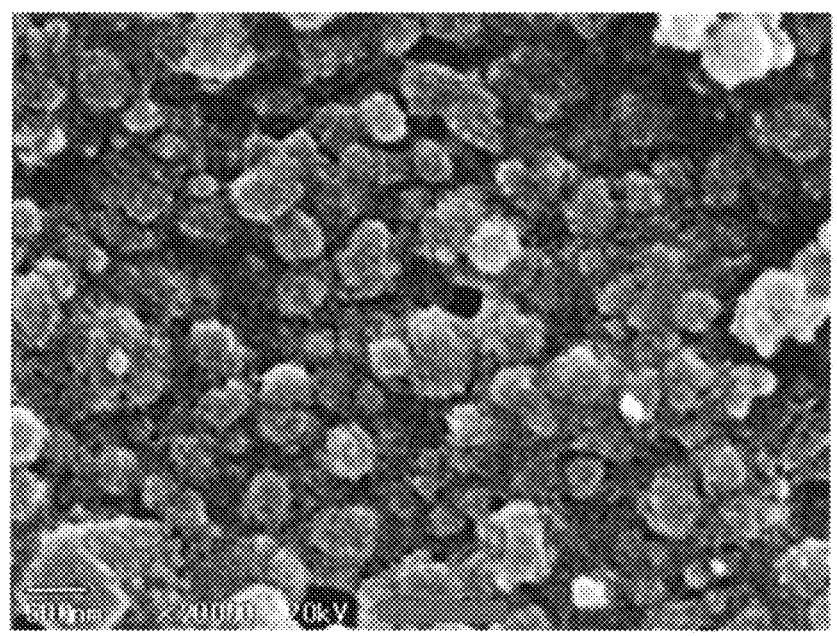
FIG. 9 is an SEM image of a zeolite material which is comprised a honeycomb structure body of a honeycomb structure of Comparative Example 1.

Furthermore, FIG. 8 and FIG. 9 show SEM images of the zeolite materials which are comprised the honeycomb structure bodies of the honeycomb structures of Example 1 and Comparative Example 1. FIG. 8 is the SEM image of the zeolite material which is comprised the honeycomb structure body of the honeycomb structure of Example 1. FIG. 9 is the SEM image of the zeolite material which is comprised the honeycomb structure body of the honeycomb structure of Comparative Example 1.

Result

As shown in Table 4, in the honeycomb structures of Examples 1 to 10, a pore volume ratio of pores having pore diameters of 0.02 to 0.15 μm was 42 vol % or less, and a compressive strength (MPa) was high. Furthermore, each of the honeycomb structures of Examples 1 to 10 included a chabazite type zeolite as a coarse particle zeolite in a zeolite material, and hence the honeycomb structure had an excellent $NO_x$ purification performance. In the honeycomb structures of Examples 1 to 10, it is considered that agglomerating properties of an inorganic bonding material improve and the compressive strength improves. Furthermore, in the SEM image shown in FIG. 8, contours of zeolite particles in the zeolite material can be comparatively clearly confirmed. That is, in such a zeolite material, it is considered that the agglomerating properties of the inorganic bonding material in the zeolite material are high, a comparatively dense neck portion is formed by the inorganic bonding material, and the compressive strength improves.

On the other hand, in the honeycomb structures of Comparative Examples 1 to 4, a pore volume ratio of pores having pore diameters of 0.02 to 0.15 μm was smaller than 42 vol %. Further, in the honeycomb structures of Comparative Examples 1 to 4, a compressive strength was remarkably low. According to the SEM image shown in FIG. 9, in the zeolite material of the honeycomb structure of Comparative Example 1, contours of zeolite particles in the zeolite material were comparatively unclear. For example, this is because the inorganic bonding material is broadly dispersed in the zeolite material. It is considered that in this zeolite material, a density of the inorganic bonding material is low and the pore volume ratio of the pores having the pore diameters of 0.02 to 0.15 μm increases. Furthermore, it is considered that in the zeolite material, the inorganic bonding material does not form any neck portion, and hence its compressive strength decreases.

Furthermore, from values of pore volume ratios of pores having pore diameters of 0.02 μm or less in Examples 6 to 8, it is presumed that a suitable range of the pore volume ratio of the pores having the pore diameters of 0.02 μm or less is 20% or less. Furthermore, it is presumed that a suitable range of a pore volume ratio of pores having pore diameters of 0.15 μm or more is from about 40 to 60% and that a suitable range of a pore volume ratio of pores having pore diameters of 0.52 μm or more is 5% or less.

A honeycomb structure of the present invention can be utilized in a purification $NO_x$ and the like contained in an exhaust gas emitted from a car engine, a construction machine engine, an industrial stationary engine, a combustion device or the like.

DESCRIPTION OF REFERENCE NUMERALS

1: partition wall, 2: cell, 3: circumferential wall, 4: honeycomb structure body, 11: first end face, 12: second end face, 31 and 131: coarse zeolite particle, 32 and 132: fine zeolite particle, 33 and 133: inorganic bonding material, 34: pore (first pore), 35: pore (second pore), 40 and 140: zeolite material, 100: honeycomb structure, and 134: pore.

What is claimed is:

1. A honeycomb structure comprising a honeycomb structure body made of a zeolite material containing at least a coarse particle zeolite having a large average particle diameter, a fine particle zeolite having an average particle diameter smaller than that of the coarse particle zeolite, and an inorganic bonding material,
    wherein the coarse particle zeolite is a chabazite type zeolite in which an average particle diameter of primary particles is 2 μm or more and 6 μm or less,
    in the fine particle zeolite, an average particle diameter of primary particles is 0.02 μm or more and smaller than 2 μm,
    the zeolite material has a ratio of a volume of pores having pore diameters of 0.02 to 0.15 μm to a volume of all pores is 42% or less,
    the zeolite material includes 3 vol % or more of the inorganic bonding material in a total volume of the zeolite material, and
    the inorganic bonding material includes alumina derived from basic aluminum lactate at a ratio of 1 vol % or more to the total volume of the zeolite material.

2. The honeycomb structure according to claim 1, wherein in the zeolite material, a ratio of a volume of pores having pore diameters smaller than 0.02 μm to the volume of all the pores is from 8 to 20%.

3. The honeycomb structure according to claim 1, wherein in the zeolite material, a ratio of a volume of pores having pore diameters in excess of 0.15 μm to the volume of all the pores is from 40 to 60%, and a ratio of a volume of pores having pore diameters of 0.52 μm or more to the volume of all the pores is 5% or less.

4. The honeycomb structure according to claim 1, wherein the coarse particle zeolite and the fine particle zeolite are copper ion-exchanged zeolite.

5. The honeycomb structure according to claim 1, wherein the coarse particle zeolite is at least one selected from the group consisting of chabazite, SAPO-34 and SSZ-13.

6. The honeycomb structure according to claim 1,
wherein the fine particle zeolite is at least one selected from the group consisting of a β-type zeolite, a Y-type zeolite, a ZSM-5 type zeolite, and a chabazite type zeolite.

7. The honeycomb structure according to claim 1,
wherein the inorganic bonding material includes the alumina derived from basic aluminum lactate and alumina derived from boehmite, and
a value of A1/A2 which is a ratio of a volume A1 of the alumina derived from basic aluminum lactate to a volume A2 of the alumina derived from boehmite is 0.6 or more.

8. The honeycomb structure according to claim 1,
wherein the zeolite material includes at least one inorganic fiber selected from the group consisting of alumina fiber, silica alumina fiber, and glass fiber.

9. The honeycomb structure according to claim 8,
wherein the zeolite material includes 3 to 8 vol % of the inorganic fiber in a total volume of the zeolite material.

* * * * *